United States Patent
Ueda

(10) Patent No.: US 6,178,187 B1
(45) Date of Patent: Jan. 23, 2001

(54) OPTICAL FIBER LASER DEVICE

(76) Inventor: Kenichi Ueda, 2195-5 Yaida, Inamachi, Tsukuba-gun, Ibaraki (JP)

( * ) Notice: Under 35 U.S.C. 154(b), the term of this patent shall be extended for 0 days.

(21) Appl. No.: 08/959,581

(22) Filed: Oct. 29, 1997

(30) Foreign Application Priority Data

Oct. 31, 1996 (JP) .................................................. 8-290173

(51) Int. Cl.$^7$ ....................................................... H01S 3/30
(52) U.S. Cl. .................. 372/6; 385/80; 385/139
(58) Field of Search .................. 372/6; 385/80, 385/139, 76

(56) References Cited

U.S. PATENT DOCUMENTS

| | | | |
|---|---|---|---|
| 4,733,938 | * 3/1988 | Lefevre et al. | 350/96.29 |
| 5,136,680 | * 8/1992 | Seike et al. | 385/139 |
| 5,259,051 | * 11/1993 | Burack et al. | 385/76 |

FOREIGN PATENT DOCUMENTS

05297228 * 12/1993 (JP) .

OTHER PUBLICATIONS

Patent Abstracts of Japan, vol. 095, No. 010, Nov. 30, 1995 & JP 07 184597A (Shin Etsu Chem Co. Ltd.) Jul. 21, 1995, abstract.
Patent Abstracts of Japan, vol. 018, No. 092 (P–1693) Feb. 15, 1994 & JP 05 297228 A (Fujitsu Ltd), Nov. 12, 1993, abstract and Figs. 1–6.
Lie A et al., "Rectangular Double–Clad Fibre Lase With Two End Bundle Pump", Electronic Letters, Aug. 29, 1996, IEE, UK, vol 32, No. 18, pp. 1673–1674, XP000637825, ISSN 0013–5194, abstract; Fig. 1.
Patent Abstracts of Japan, vol. 097, No. 006. Jun. 30, 1997 & JP 09 055556 A (Oki Electric Ind. Co. Ltd.) Feb. 25, 1997, abstract.
Patent Abstracts of Japan, vol. 097, No. 005, May 30, 1997 & JP 09 026379A (Fujitsu Ltd; Nippon Telegr & Teleph Corp) Jan. 28, 1997, abstract.
Ueda et al., "Future of High Power Fiber Lasers", Second International Conf. on Modern Laser Physics (MPLP), Novosibirsk, Russia, Jul. 28–Aug.2, 1997, vol. 8, No. 3, pp. 774–781, Laser Physics, May–Jun. 1998, MAIK Nauka/ Interperiodica.
Publishing, Russia, pp. 779–780, figs. 12–14 Ueda, "Optical Cavity and Future Style of High Power Fiber Lasers", SPIE vol. 3267—Laser Resonators, San Jose, CA USA Jan. 26–27, 1998, vol. 3267, pp. 14–22, XP 002092368, ISSN 0277–786X, Proceedings of the SPIE– International Society for Optical Engineering, 1998, SPIE–Int. Soc. Opt. Eng. USA, sect. 8–9, figs. 12–14.
"High–power cw neodymium–doped fiber laser operating at 9.2 W with high beam quality", Zellmer et al., Optics Letters, vol. 20, No. 6, Mar. 1995.

* cited by examiner

Primary Examiner—Leon Scott, Jr.
(74) Attorney, Agent, or Firm—Perman & Green, LLP

(57) ABSTRACT

There is proposed an optical fiber laser device which can also precisely perform a frequency control or the like in relation to a vertical mode of a resonator. A long piece of laser fiber 2a which has been wound multiple times is embedded with clearance and fixed in a transparent ultraviolet hardening resin 1a formed in a rectangular parallelepiped. Both end portions of the laser fiber are exposed to the outside. The laser fiber 2a is provided with a clad 6a on a periphery of a core 5a. Inside the core 5a, 0.5 at % of $Nd^{3+}$ ion is doped.

25 Claims, 3 Drawing Sheets

OPTICAL FIBER LASER DEVICE

REFERENCE TO RELATED APPLICATION

This application claims the priority right under 35 U. S. C 119, of Japanese Patent Application No. Hei 08-290173 filed on Oct. 31, 1996, the entire disclosure of which is incorporated herein by reference.

BACKGROUND OF THE INVENTION

1. Field of the Invention

The present invention relates to an optical fiber laser device provided with a laser active substance inside an optical fiber for receiving an activating light from outside and performing a laser oscillation.

2. Description of the Related Art

In a field of optical communication or optical processing technique, development of an inexpensive laser device with a higher output is requested. It is heretofore known that an optical fiber laser device has a high possibility for satisfying such request.

In the optical fiber laser device, by appropriately selecting a core diameter, a difference in refractive index between a core and a clad and the like, an oscillating mode can be relatively easily made single. Also, by confining light at a high density, interaction of a laser active substance and light can be enhanced. Further, by lengthening the device, a long interacting length can be obtained. Therefore, a spatially high quality of laser beams can be generated at a high efficiency. Consequently, a high quality of laser beams can be obtained relatively inexpensively.

Here, to realize a higher output or higher efficiency of laser beams, an activating light needs to be efficiently introduced to a laser active ion doping region (usually, a core portion) in an optical fiber. However, when the core diameter is set in accordance with wave guide conditions of a single mode, the core diameter is restricted to about dozen of microns or less of the laser active ion doping region (usually, the core portion). It is usually difficult to efficiently introduce the activating light to such a small diameter. To overcome this problem, for example, a so-called double clad type of a fiber laser is proposed.

FIG. 5 is an explanatory view of the double clad type of the fiber laser. As shown in the figure, in the double clad type of the fiber laser, on an outer periphery of a clad portion 16 provided is a second clad portion 17 which is constituted of a transparent substance having a refractive index much lower than that of the clad portion 16. By total reflection resulting from a difference in refractive index between the second clad portion 17 and the clad portion 16, an activating light 13 introduced from an end face is enclosed in the clad portion 16 and a core portion 15. When the enclosed activating light repeatedly passes the doping region of a laser active ion (usually, a core portion 14), the activating light is gradually absorbed by the laser active ion. Thereby, a laser beam with a high output can be obtained (reference document; E. Snitzer, H. Po. Fhakimi, R. Tumminelli, and B. C. McCllum, in Optical Fiber Sensors Vol. 2 of 1988 OSA Technical Digest Series (Optical Society of America, Washington, D.C., 1988), paper PD5.).

In the double clad type of the fiber laser, an inlet port of the activating light can be enlarged as much as dozens to thousands of microns. Therefore, the activating light can be easily introduced to the fiber. Also, a region where laser oscillation takes place can be restricted to dozens of to several microns. Therefore, a light with a laser oscillating wavelength can be advantageously propagated in a single mode, and a highly dense light can be enclosed.

However, the optical fiber laser usually has an disadvantage that a laser oscillating condition is largely varied by an influence of disturbances, for example, oscillation, pressure, sound and the like. This is because in the optical fiber, a laser amplifying medium itself is inseparably formed integrally with a laser resonator itself. Further, a medium has a very large asbestos ratio. The optical fiber is given flexibility, but lacks mechanical strength. Therefore, the influence of disturbances is much enlarged. The positive use of the influence is advantageous in a fiber sensor and the like. Conversely, this is largely disadvantageous for a usual solid laser device. For example, in the optical fiber laser, a transverse mode can be considerably strictly controlled because of clear boundary conditions given by fiber transmission. However, a frequency control or the like relating to a vertical mode of a resonator is difficult. In this respect, it should be said that the optical fiber laser is close to a laser using liquid as a medium, rather than to a solid laser.

SUMMARY OF THE INVENTION

An object of the invention is to provide an optical fiber laser device which can also precisely perform a frequency control or the like in relation to a vertical mode of a resonator.

To attain this and other objects, the invention provides an optical fiber laser device provided with a laser active substance inside an optical fiber for receiving an activating light from outside and performing a laser oscillation. The optical fiber is partially or entirely covered and fixed by a hardening substance.

In the optical fiber laser device, the optical fiber is remarkably longer as compared with each distance on three-dimensional coordinate axes representing a magnitude of a region in which the optical fiber is contained. In the region, the optical fiber is repeatedly folded and wound to be disposed therein. The region is filled without clearance with the hardening substance.

Also in the optical fiber laser device, the hardening substance is a hardening organic resin, a glass, a hardening inorganic medium, or a metal.

Further in the optical fiber laser device, the hardening substance is a transparent substance which has a refractive index value equal to or less than a refractive index value of a substance constituting a clad portion of the optical fiber.

The invention also provides an optical fiber laser device provided with a laser active substance inside an optical fiber for receiving an activating light from outside and performing a laser oscillation. The optical fiber is remarkably longer as compared with each distance on three-dimensional coordinate axes representing a magnitude of a region in which the optical fiber is contained. In the region, the optical fiber is repeatedly folded and wound to be disposed therein.

The optical fiber is integrally formed and fixed in such a manner that adjacent portions of the repeatedly folded and wound optical fiber partially or entirely adhere close to one another to a degree to which an interface between a core and a clad is not disturbed.

In the optical fiber laser device, the optical fiber has a clad with a rectangular cross section.

Also in the optical fiber laser device, the optical fiber is a double clad type of an optical fiber in which further on an outer periphery of the clad, a second clad is formed.

DESCRIPTION OF THE PREFERRED EMBODIMENTS

First Embodiment

Figure 1:
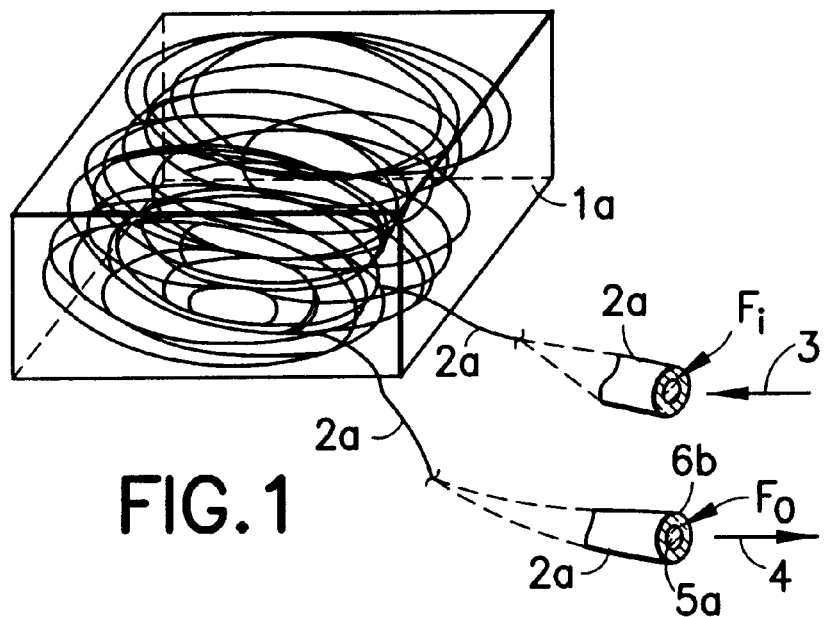
FIG. 1 is a diagrammatic representation of a constitution of an optical fiber laser device according to a first embodiment of the present invention.

FIG. 1 is a view showing a constitution of an optical fiber laser device according to a first embodiment of the invention.

In FIG. 1, in the optical fiber laser device, a long piece of laser fiber 2a which has been wound multiple times is embedded and fixed without any clearance in an ultraviolet hardening resin 1a formed in a rectangular parallelepiped of 5 cm×5 cm×2 cm. Only both end portions of the laser fiber are exposed to the outside.

The laser fiber 2a is provided with a core 5a having a diameter of 10 μm and a clad 6a having a diameter of 50 μm, and is basically constituted of one piece of quartz system glass fiber having a number of openings of 0.1 and a length of about 50 m. Inside the core 5a, 0.5 at % of $Nd^{3+}$ ion is doped.

Also, on one end face Fi of the laser fiber 2a formed is a diffraction grating which has, relative to a light transmitted from the inside of the core, a reflectivity of 100% of light with a wavelength of 1.06 μm and a reflectivity of 100% of light with a wavelength of 0.8 μm. On the other end face Fo applied is a multi-layered film reflective coat which has a reflectivity of 99.0% of light with a wavelength of 1.06 μm and a reflectivity of 99.9% of light with a wavelength of 0.8 μm.

The optical fiber laser device is manufactured by placing in a metallic housing of a rectangular parallelepiped with 5 cm×5 cm×2 cm, one 50 m long continuous piece of laser fiber 2a which has been wound multiple times and compacted, in such a manner that the fiber does not break. Then, an ultraviolet hardening resin is poured into the housing without any clearance left therein. After the resin completely hardens, the housing is removed.

It could be confirmed that when from one end face Fi of the optical fiber laser device a semiconductor laser beam 3 with a wavelength of about 0.8 μm and a maximum output of 10 W was radiated as an activating light, from the other end face Fo, a laser oscillating output light 4 with a wavelength of 1.06 μm and an output of 4 W was emitted.

Second Embodiment

Figure 2:
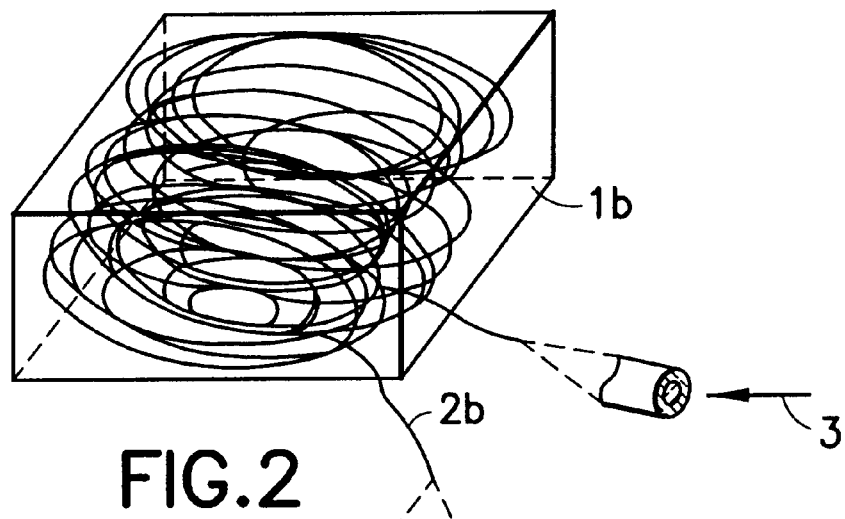
FIG. 2 is a diagrammatic representation of a constitution of an optical fiber laser device according to a second embodiment.
Figure 2:
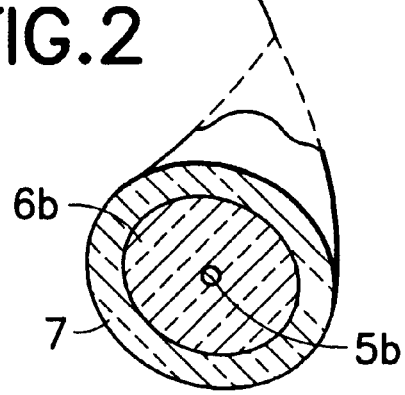

FIG. 2 is a view showing a constitution of a second embodiment of the invention. The second embodiment is different from the first embodiment in that instead of the laser fiber 2a of the first embodiment, a double clad type of laser fiber 2b is used, and instead of the ultraviolet hardening resin 1a, a metal zinc 1b is used for fixing the double clad type of laser fiber 2b.

The double clad type of laser fiber 2b is a quartz system glass fiber provided with a core 5b having a diameter of 10 μm and a clad 6b having a diameter of 500 μm. A diameter of a second clad 7 formed on an outer periphery of the clad 6b is 700 μm. A difference in refractive index between the core 5b an the clad 6b is 1%, while a difference in refractive index between the clad 6b and the second clad 7 is 5%. These core and clads have a circular cross section. Inside the core 5b, 0.5 at % of $Nd^{3+}$ ion is doped.

Also, on one end face Fi of the double clad type of laser fiber 2b formed is a diffraction grating which has, relative to a light transmitted from the inside of the core, a reflectivity of 100% of light with a wavelength of 1.06 μm and a reflectivity of 100% of light with a wavelength of 0.8 μm. On the other end face Fo applied is a multi-layered film reflective coat which has a reflectivity of 99.0% of light with a wavelength of 1.06 μm and a reflectivity of 99.9% of light with a wavelength of 0.8 μm.

The optical fiber laser device is manufactured by placing in a metallic housing of a rectangular parallelepiped with 30 cm×30 cm×15 cm, one 100 m long piece of the double clad type of laser fiber 2b which has been wound multiple times and compacted, in such a manner that the fiber does not break. Then, an molten liquid of metal zinc is poured into the housing without any clearance left therein. After the metal zinc completely hardens, the housing is removed.

It could be confirmed that when from one end face Fi of the optical fiber laser device a semiconductor laser beam with a wavelength of about 0.8 μm and a maximum output of 10 W was radiated as an activating light, from the other end face Fo, a laser oscillating light with a wavelength of 1.06 μm and an output of 2 W was emitted.

Third Embodiment

Figure 3:
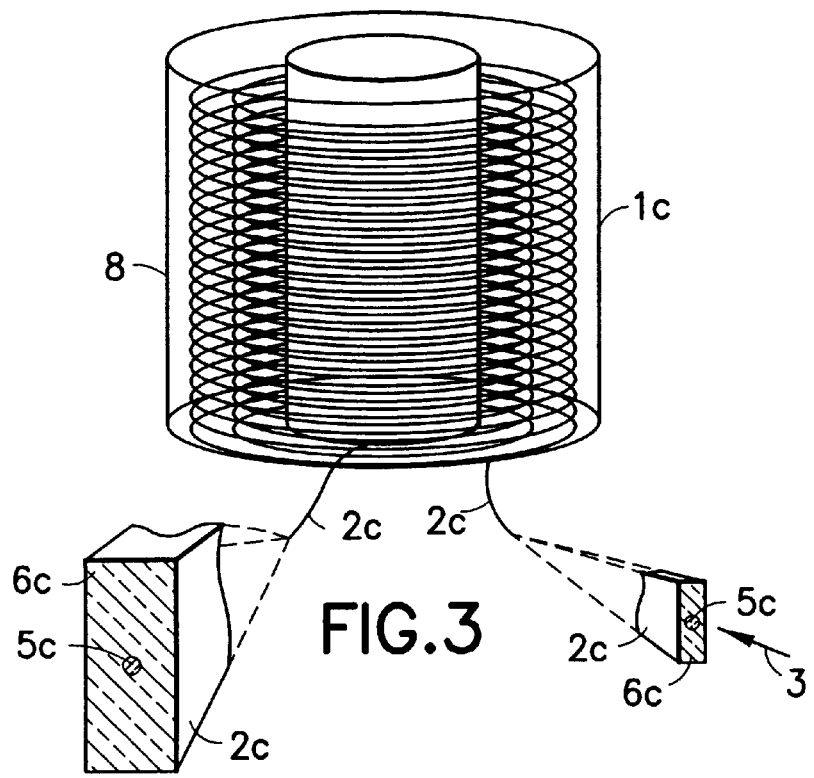
FIG. 3 is a diagrammatic representation of a constitution of an optical fiber laser device according to a third embodiment.

FIG. 3 is a view showing a constitution of an optical fiber laser device according to a third embodiment of the invention.

In FIG. 3, in the optical fiber laser device, a long piece of laser fiber 2c which has been wound multiple times is contained in a double cylindrical housing 8 with an inner diameter of 10 cm, an outer diameter of 14 cm and a height of 20 cm. In the double cylindrical housing, an ultraviolet hardening resin 1c is embedded without clearance and fixed. Only both end portions of the laser fiber 2c are exposed to the outside.

The laser fiber 2c is provided with a clad 6c having a rectangular cross section of 100×700 μm and a core 5c having a diameter of 10 μm, and is basically. constituted of a quartz system glass fiber. A difference between a refractive index of the core 5c and a refractive index of the clad 6c is 1%. Inside the core 5c, 0.5 at % of $Nd^{3+}$ ion is doped.

Also, on one end face Fi of the laser fiber 2c formed is a diffraction grating which has, relative to a light transmitted from the inside of the core, a reflectivity of 100% of light with a wavelength of 1.06 μm and a reflectivity of 100% of light with a wavelength of 0.8 μm. On the other end face Fo applied is a multi-layered film reflective coat which has a reflectivity of 99.0% of light with a wavelength of 1.06 μm and a reflectivity of 99.9% of light with a wavelength of 0.8 μm.

It could be confirmed that when from one end face Fi of the optical fiber laser device a semiconductor laser beam with a wavelength of about 0.8 μm and a maximum output of 10 W was radiated as an activating light, from the other end face Fo, a laser oscillating output light with a wavelength of 1.06 μm and an output of 3 W was emitted.

When the clad has a rectangular cross section as in the third embodiment, following advantages are provided, different from the clad with a circular cross section.

Specifically, in case of the circular cross section, in a propagation mode, an absorptive saturation occurs in which only a mode bonded with a central core is absorbed and taken. It is, therefore, difficult to obtain a large laser output. Such absorptive saturation does not arise in the first clad with the rectangular cross section. In the fiber having the clad cross section which does not cause the absorptive saturation, an effective absorption coefficient at which an incident activating light is absorbed in the core while being propagated in the clad is αeff=α·Acore /Aclad. Here, α is an absorption coefficient of the core portion, and Acore and Aclad are cross-sectional areas of the core portion and the first clad portion, respectively. Therefore, when in accordance with the length of the fiber laser wound inside, the cross-sectional area of the first clad is controlled, then in a clad activating system, a preferable activating intensity can be supplied over all the regions with the fiber laser. Further, a transverse mode of laser oscillation is controlled by fiber transmission, but, additionally, when the fiber end faces exposed to the outside are coated, then a monolithic resonator is constituted although the resonator has a length of several tens of meters or more. A control in a stabilized vertical mode can be achieved.

Fourth Embodiment

Figure 4:
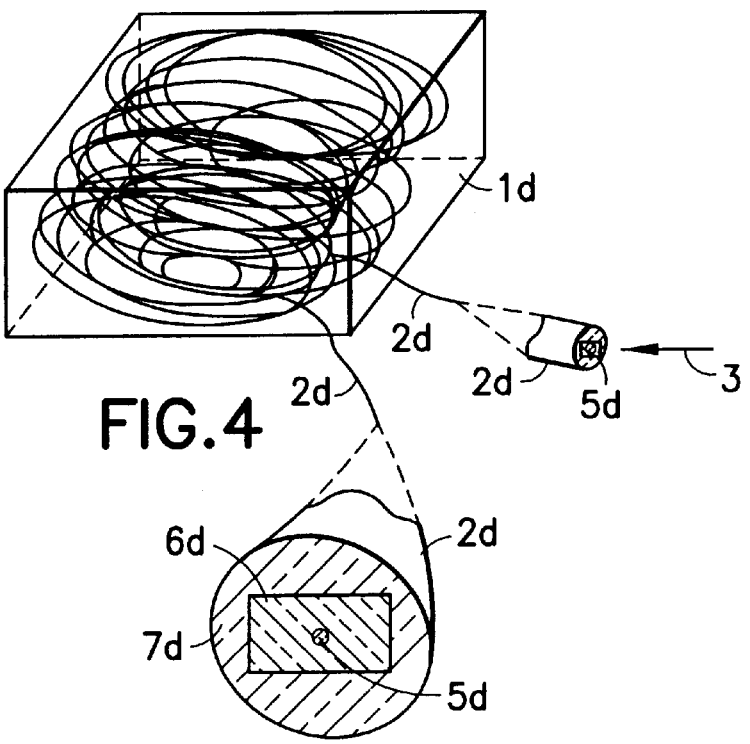
FIG. 4 is a diagrammatic representation of a constitution of an optical fiber laser device according to a fourth embodiment.
Figure 5:
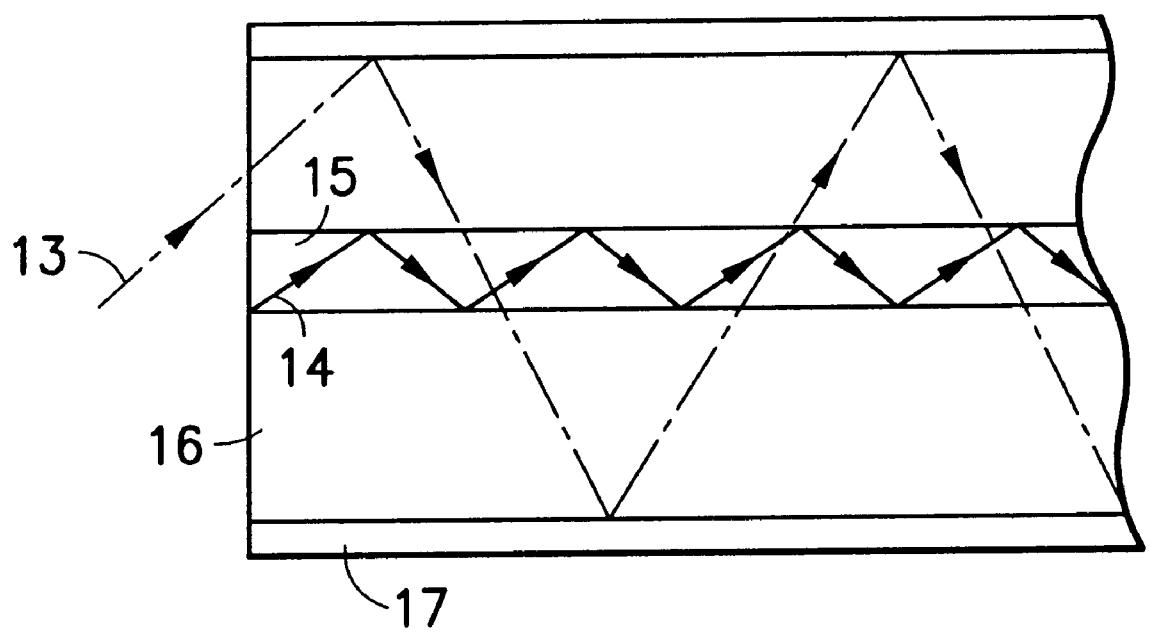
FIG. 5 is a diagrammatic representation of a constitution of a prior-art double clad type of an optical fiber laser device.

FIG. 4 is a view showing a constitution of an optical fiber laser device according to a fourth embodiment of the invention.

In FIG. 4, in the optical fiber laser device, a long piece of laser fiber $2d$ which has been wound multiple times is embedded without clearance and fixed in a metal aluminum $1d$ formed in a rectangular parallelepiped of 50 cm×10 cm×50 cm. Only both end portions of the laser fiber are exposed to the outside.

The laser fiber $2d$ is a double clad type of laser fiber, and is provided with a clad $6d$ having a rectangular cross section of 100×500 μm. On an outer periphery of the clad $6d$, a second clad $7d$ with a diameter of 700 μm is formed. A diameter of a core $5d$ is 10 μm. A basic constitution is a quartz system double clad type of glass fiber in which a difference between a refractive index of the clad $6b$ and a refractive index of the second clad $7d$ is 1%. Inside the core $5d$, 0.5 at % of $Nd^{3+}$ ion is doped.

Also, on one end face Fi of the laser fiber $2d$ formed is a diffraction grating which has, relative to a light transmitted from the inside of the core, a reflectivity of 100% of light with a wavelength of 1.06 μm and a reflectivity of 100% of light with a wavelength of 0.8 μm. On the other end face Fo applied is a multi-layered film reflective coat which has a reflectivity of 99.0% of light with a wavelength of 1.06 μm and a reflectivity of 99.9% of light with a wavelength of 0.8 μm.

It could be confirmed that when from one end face Fi of the optical fiber laser device a semiconductor laser beam with a wavelength of about 0.8 μm and a maximum output of 10 W was radiated as an activating light, from the other end face Fo, a laser oscillating output light with a wavelength of 1.06 μm and an output of 2.5 W was emitted.

As aforementioned, in the embodiments, as the hardening substance, ultraviolet hardening resin, metal zinc and metal aluminum are used. Alternatively, as the hardening substance available is, for example, thermal hardening resin or another organic resin; quartz system glass prepared in a sol-gel method; cement, gypsum or another hardening inorganic medium; or indium, copper, duralmin, or another metal or its alloy.

Also in the embodiments, the laser fiber is fixed by the hardening substance. Alternatively, without using the hardening substance, the laser fiber is integrally formed and fixed in such a manner that adjoining laser fiber portions are partially or entirely adhered close to one another to a degree to which an interface between the core and the clad is not disturbed. Specifically, for example, a glass constituting the optical fiber is heated to a glass deformation temperature (however, the heated glass has a viscosity to a degree to which the interface between the core and the clad is not disturbed). A clearance between the respective fiber portions is evacuated with a pressure being applied thereto. The entire laser fiber is fused and formed integrally to have a substantially fixed shape without being in the hardening substance.

As aforementioned, the invention provides the optical fiber laser device provided with the laser active substance inside the optical fiber for receiving an activating light from outside and performing a laser oscillation. The optical fiber is partially or entirely covered and fixed by the hardening substance. Alternatively, the laser fiber is integrally formed and fixed in such a manner that adjoining portions of the repeatedly folded or wound laser fiber are partially or entirely adhered close to one another to the degree to which the interface between the core and the clad is not disturbed. Therefore, the optical fiber laser device can also precisely perform a frequency control or the like in relation to the vertical mode of the resonator.

What is claimed is:

1. An optical fiber laser device for receiving an activating light from outside and performing a laser oscillation, the device comprising:

an optical fiber with a laser active substance therein; and a hardening substance partially covering or entirely covering and fixing said optical fiber for controlling a laser oscillation frequency of the laser device;

wherein said optical fiber is longer as compared with each distance on three-dimensional coordinate axes representing a magnitude of a region in which said optical fiber is contained, said optical fiber being repeatedly folded and wound to be disposed therein, and wherein said region is filled without void with said hardening substance for fixing said optical fiber.

2. The optical fiber laser device according to claim 1, wherein said hardening substance is a material selected from the group consisting of a glass, a hardening inorganic medium and a metal.

3. The optical fiber laser device according to claim 1, wherein said hardening substance is a transparent material having a refractive index value equal to or less than that of a substance constituting a clad portion of said optical fiber.

4. The optical fiber laser device according to claim 1, wherein said optical fiber has a clad having a rectangular cross section.

5. The optical fiber laser device according to claim 1, wherein said optical fiber is a double clad type optical fiber in which a second clad is formed further on an outer periphery of the clad.

6. An optical fiber laser device for receiving an activating light from outside and performing a laser oscillation, the device comprising:

an optical fiber for containing a laser substance therein; said optical fiber being longer as compared with each distance on three-dimensional coordinate axes representing a magnitude of a region in which said optical fiber is contained, and in said region, being repeatedly folded and wound to be disposed therein; and fixing means for fixing said optical fiber, the fixing means comprising said optical fiber being fused, at least in part, for integrally forming and fixing said optical fiber, wherein said fused optical fiber has a substantially fixed shape without being in a hardening substance, and said fused optical fiber is formed and fixed in such a manner that adjacent portions of said repeatedly folded and wound optical fiber partially or entirely adhere close to one another to a degree to which an interface between a core and clad is not disturbed.

7. The optical fiber laser device according to claim 6, wherein said optical fiber has a clad having a rectangular cross section.

8. The optical fiber laser device according to claim 6, wherein said optical fiber is a double clad type optical fiber in which a second clad is formed further on an outer periphery of the clad.

9. An optical fiber laser device for receiving an activating light from outside and performing a laser oscillation, the device comprising:

an optical fiber with a laser active substance therein; and a hardening substance partially covering or entirely covering and fixing said optical fiber;

wherein said hardening substance is a transparent material having a refractive index value equal to or less than that of a substance constituting a clad portion of said optical fiber.

10. The optical fiber laser device according to claim 9, wherein said optical fiber is longer as compared with each distance on three-dimensional coordinate axes representing a magnitude of a region in which said optical fiber is contained, said optical fiber being repeatedly folded or wound to be disposed in said region, and said region being filled without clearance with said hardening substance.

11. The optical fiber laser device according to claim 9, wherein said hardening substance is a material selected from the group consisting of a hardening organic resin, a glass, a hardening inorganic medium, and a metal.

12. The optical fiber laser device according to claim 9, wherein said optical fiber has a clad having a rectangular cross section.

13. The optical fiber laser device according to claim 9, wherein said optical fiber is a double clad type optical fiber in which a second clad is formed further on an outer periphery of a first clad.

14. An optical fiber laser device for receiving an activating light from outside and performing a laser oscillation, the device comprising:

an optical fiber for containing a laser active substance therein; and a hardening substance for partially or entirely covering and fixing said optical fiber; wherein said optical fiber is longer as compared with each distance on three-dimensional coordinate axes representing a magnitude of a region in which said optical fiber is contained, said optical fiber being repeatedly folded or wound to be disposed in said region, and said region is filled without clearance with said hardening substance.

15. The optical fiber laser device according to claim 14, wherein said hardening substance is a material selected from the group consisting of a glass, a hardening inorganic medium, and a metal.

16. The optical fiber laser device according to claim 14, wherein said optical fiber has a clad having a rectangular cross section.

17. The optical fiber laser device according to claim 14, wherein said optical fiber is a double clad type optical fiber in which a second clad is formed further on an outer periphery of a first clad.

18. An optical fiber laser device for receiving an activating light from outside and performing a laser oscillation, the device comprising:

an optical fiber for containing a laser active substance therein; and a hardening substance for partially or entirely covering and fixing said optical fiber; wherein said hardening substance is made from glass or metal.

19. The optical fiber laser device according to claim 18, wherein said optical fiber is longer as compared with each distance on three-dimensional coordinate axes representing a magnitude of a region in which said optical fiber is contained, said optical fiber being repeatedly folded or wound to be disposed in said region, and said region being filled without clearance with said hardening substance.

20. The optical fiber laser device according to claim 18, wherein said optical fiber has a clad having a rectangular cross section.

21. The optical fiber laser device according to claim 18, wherein said optical fiber is a double clad type optical fiber in which a second clad is formed further on an outer periphery of a first clad.

22. An optical fiber laser device for receiving an activating light from outside and performing a laser oscillation, the device comprising:

an optical fiber for containing a laser active substance therein;

said optical fiber being longer as compared with each distance on three-dimensional coordinate axes representing a magnitude of a region in which said optical fiber is contained, said optical fiber being repeatedly folded or wound to be disposed in said region; and a fixing means for integrally forming and fixing said optical fiber in such a manner that adjacent portions of said repeatedly folded or wound optical fiber partially or entirely adhere close to one another to a degree to which an interface between a core and a clad is not disturbed.

23. The optical fiber laser device according to claim 22, wherein said optical fiber has a clad having a rectangular cross section.

24. The optical fiber laser device according to claim 22, wherein said optical fiber is a double clad type optical fiber in which a second clad is formed further on an outer periphery of the clad.

25. An optical fiber laser device for receiving an activating light from outside and performing a laser oscillation, the device comprising:

an optical fiber with a laser active substance therein; and means for controlling a laser oscillation frequency of the laser device, said means comprising a hardening substance partially covering or entirely covering and fixing said optical fiber.

* * * * *